United States Patent Office 3,408,967
Patented Nov. 5, 1968

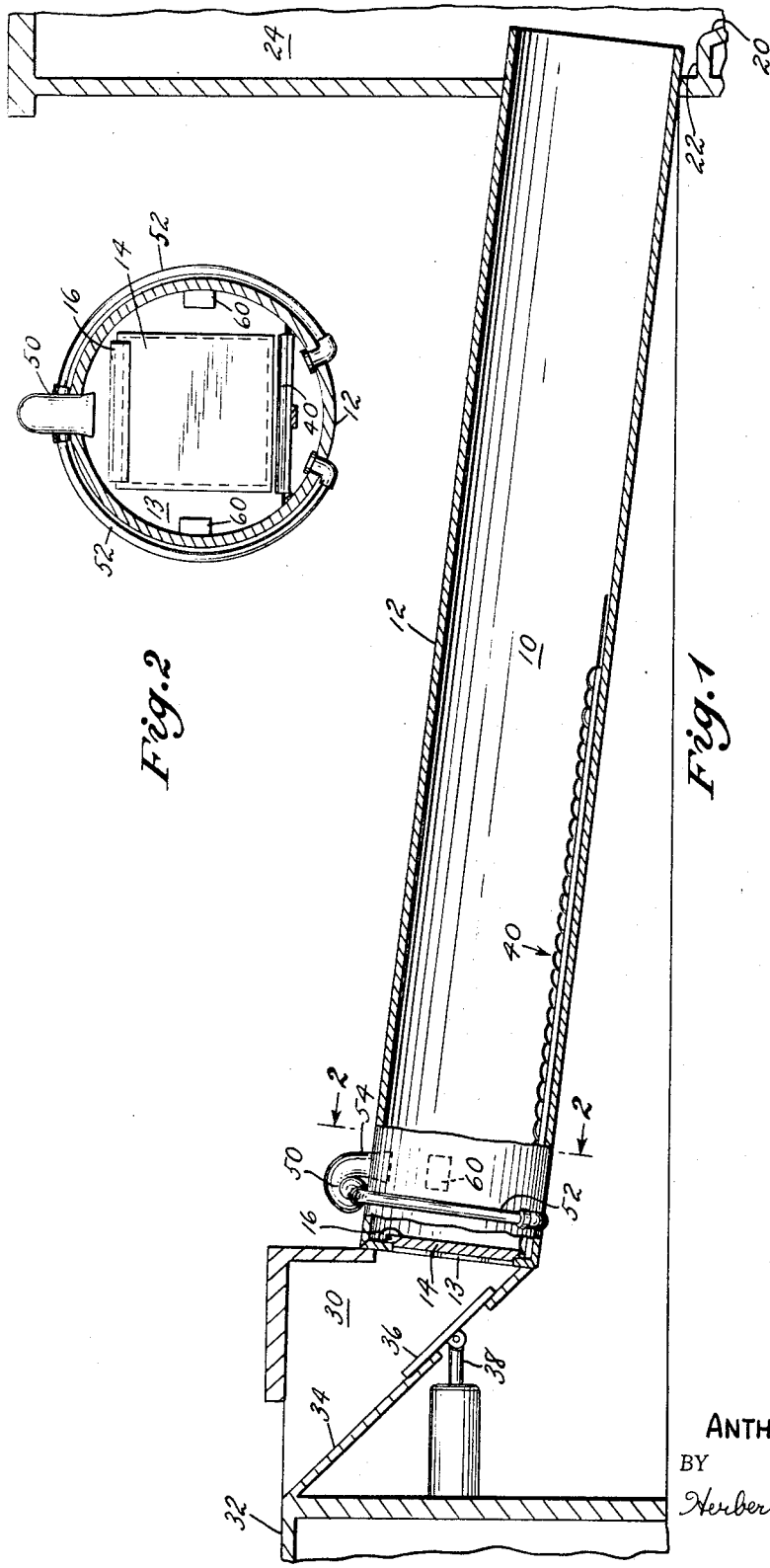

3,408,967
PROCESS AND APPARATUS FOR THE INCINERATION OF REFUSE
Anthony J. Maitilasso, Rockaway, N.J., assignor to Dinosaur Reduction Chamber Inc., Newark, N.J., a corporation of New Jersey
Filed July 22, 1966, Ser. No. 567,152
2 Claims. (Cl. 110—7)

ABSTRACT OF THE DISCLOSURE

Process and apparatus for the incineration of refuse in which refuse is ignited and subjected to self-combustion at a temperature in the range from about 900° F. to 1150° F. to effect at least about a 50% reduction in the solid volume thereof. The refuse thereafter is discharged into an enclosed secondary incineration zone in which incineration is completed under forced combustion at a temperature above about 1600° F.

---

The present invention relates to a process and apparatus for the incineration of refuse. More particularly, it relates to a two-stage combustion process which is highly effective for efficient and economical incineration of municipal refuse.

In accordance with the present invention, a process for the incineration of refuse comprises charging refuse into an enclosed primary incineration zone, forcing combustion air through said primary incineration zone, igniting said refuse and maintaining self-combustion thereof at a temperature in the range of from about 900° F. to about 1150° F. to form gaseous products of combustion and to effect at least about 50 percent reduction in the solid volume of said refuse as compared to its volume as originally charged to said primary incineration zone, and discharging said reduced volume of solid refuse from said primary incineration zone to an enclosed secondary incineration zone in which incineration is completed under forced combustion at a temperature above about 1600° F.

Further in accordance with the present invention is an apparatus for carrying out the instant process. Suitably, this apparatus comprises a conduit for combustible refuse, a charging opening in said conduit adapted to permit the charging of refuse to said chamber, a discharge opening in said conduit at the end thereof remote from said charging opening, said discharge opening being disposed to feed discharge therefrom into a forced combustion incinerator, means for closing said charging opening, a grate for supporting said refuse above the bottom of said conduit, means for forcing air through said grate and into said refuse, means for forcing air through said conduit above said refuse, means for advancing said refuse through said conduit, and means for maintaining the temperature of said conduit at not higher than about 1150° F. during self-combustion of combustible refuse therein.

The process and apparatus of the present invention will be further illustrated in conjunction with the appended drawings which are illustrative of but not limitations on the process and apparatus of the present invention.

In the drawings:

FIG. 1 is a view, in elevation, principally in vertical section, of an apparatus for carrying out the process of the present invention;

FIG. 2 is a sectional view in elevation taken along the line 2—2 of FIG. 1 in the direction shown; and FIG. 3 is a detail in perspective of a portion of a supporting grate illustrated in FIGS. 1 and 2.

In the figures, a primary refuse reduction chamber 10 is formed by a cylindrical stainless steel tube 12 which is closed at its intake end by a circular end wall 13 having therein a generally rectangular charging gate 14. The gate is pivoted along its upper edge on a pivot 16 to permit it to swing into the interior of the reduction chamber and open the charging end thereof. The cylindrical steel tube 12 slopes downwardly from the entrance end at the charging gate 14 at a 15° grade into a forced combustion incinerator 24. The tube 12 is open at its discharge end, which is disposed in close proximity to and slightly above a hopper opening 20 in the charging floor 22 of the forced combustion incinerator 24. (The term forced combustion incinerator is used herein to refer to an incinerator to which a combustible fuel is supplied separately and apart from any refuse per se to effect incineration at an elevated temperature, typically above at least about 1600 F.)

The charging gate 14 at the inlet of the primary refuse reduction chamber 10 is disposed at the base of a refuse hopper 30 adapted to be charged with refuse from a loading platform 32 at the top thereof by means of an inclined chute 34.

Disposed at the base of the inclined chute 34 is a blade 36 of a hydraulic ram 38. The blade 36 of the ram is slightly smaller than the charging gate 14 so as to be able to enter that gate and is adapted to drive forward into the entry of the primary refuse reduction chamber, and thereby charge refuse thereinto from the refuse hopper 30 as required.

A shutter grate 40 forms an elevated floor along the first half of the cylindrical steel tube 12. As shown in somewhat more detail in FIG. 3, the shutter grate comprises a pair of elongated side rails 42 (of arcuate cross section) on which are mounted a series of equally spaced pivot bars 44. A rack and pinion drive linkage is provided to facilitate adjustment of the angular rotation of the pivot bar 44, and thereby, the air spaces between grate elements 48 carried thereon.

As illustrated in FIG. 1 and FIG. 2, a blower 50 is disposed at the top of the charging end of the cylindrical tube 12. The blower outlet is provided with a pair of ducts 52 for directing air to the underside of the grate elements 48 of the shutter 40. Air is also supplied by the blower 50 to the top of the primary refuse reduction chamber 10 by means of an additional duct 54.

A pair of horizontally diametrically opposed primary oil burners 60 are positioned on the sides of cylindrical steel tube 12 proximate to the charging end of the primary refuse reduction chamber.

In operation, combustible refuse (containing at least 50 percent by volume of self-combustibles) is charged from the loading platform 32 onto the inclined chute 34 and into the refuse hopper 30. Periodic extension of the hydraulic ram 40 assists in delivering the refuse under the pivoted charging gate 14 and onto the shutter grate 40. The 15° downgrade of the cylindrical steel tube 12 assists in maintaining a continuous flow of refuse through the primary reduction chamber 10 and into the forced combustion incinerator 24.

At the beginning of operation, the primary burners 60 are used to initiate combustion of the combustible refuse, however once the unit has started in operation, self combustion is adequate to continue operation thereof.

As the combustible refuse travels through the primary reduction chamber 10 over the shutter grate 40, it is permeated by an underdraft of air delivered beneath the grate through the duct 52. Simultaneously an overdraft current of air delivered through the duct 54, passes over the top of the refuse, the combined action of the overdraft and underdraft assisting in the induction and maintenance of self-ignition. Once the refuse has become thoroughly ignited, further underdraft becomes unnecessary and therefore the shutter grate 40 extends only approximately half the length of the primary refuse reduction chamber 10.

The gaseous products of combustion, as well as any fly ash contained therein, are discharged from the discharge end of the primary refuse reduction chamber into the forced combustion incinerator and may be disposed of thereby in the customary manner, e.g. venting to the atmosphere after scrubbing, as required, in appropriate electrical precipitators, and the like.

In connection with the operation of the primary refuse reduction chamber, it should be noted that the rate of passage of refuse therethrough, as determined by the 15° downslope of the chamber and the action of the hydraulically operated blade 36, is coordinated with the rate of throughput of air supplied by the blower 50, and other heat losses from the uninsulated metal tube 12, e.g., by radiation and convection, to maintain a temperature in the primary refuse reduction chamber within the range of about 900° F. to about 1150° F. In this temperature range, the self-combustible elements which normally constitute about 75 percent of the solid wastes charged to community or municipal incinerators, e.g. paper, wood, grease, and the like, are rapidly burned and converted into volatile combustion products. The substantially higher temperatures, on the order of about 1600° F., required to accomplish complete incineration of the broad spectrum of non-combustibles also occurring in normal municipal refuse are quite unnecessary to the reduction in solid refuse volume by self-combustion, and entail very substantial additional problems and expenses growing out of increased fuel consumption, heat removal difficulties, and high temperature operation. Thus, the present process accomplishes a reduction of solid wastes of at least about 50 percent and usually as high as 75 percent in volume, depending on the proportion of self-combustibles therein, prior to subsequent disposition thereof to forced combustion incineration.

It is to be understood that the invention herein illustrated and described is to be limited only by the scope of the claims appended hereto, and that various changes and equivalents may be substituted without departing from the true spirit of the invention.

What is claimed is:

1. In apparatus for the incineration of combustible refuse, a cylindrical all-metallic inclined conduit having upper and lower ends, said upper end being open and constituting a charging opening, said lower end being open and constituting a discharge opening, a forced combustion incinerator connecting at its lower end with said discharge opening, removable closure means for said charging opening, a grate spaced from the bottom of said conduit for receiving refuse, means for forcing air through said grate and into refuse thereon, means for introducing air under pressure into said conduit above said grate, means for advancing refuse from the charging opening to the discharge opening, and means for maintaining the operating temperature of said conduit at a temperature less than 1150° F., the inclination of said conduit having a 15° downslope into said forced combustion incinerator.

2. The apparatus of claim 1 in which a primary burner is disposed above the grate and in proximity to the charging opening of said conduit.

References Cited

UNITED STATES PATENTS

| 1,835,147 | 12/1931 | Drew | 110—14 |
| 1,973,697 | 9/1934 | Bailey | 110—10 |
| 2,481,504 | 9/1949 | Ferro et al. | 110—7 |
| 2,752,869 | 7/1956 | Kennan | 110—7 |

JAMES W. WESTHAVER, *Primary Examiner.*